Sept. 4, 1951 W. E. BRADLEY 2,566,820
SIGNAL MIXING SYSTEM
Filed Aug. 22, 1947

INVENTOR.
WILLIAM E. BRADLEY
BY
Orrin V. Hazeltine
AGENT

Patented Sept. 4, 1951 2,566,820

UNITED STATES PATENT OFFICE 2,566,820

SIGNAL MIXING SYSTEM

William E. Bradley, Springfield Township, Montgomery County, Pa., assignor to Philco Corporation, Philadelphia, Pa., a corporation of Pennsylvania Application August 22, 1947, Serial No. 770,065

4 Claims. (Cl. 332—7)

Figure 1:
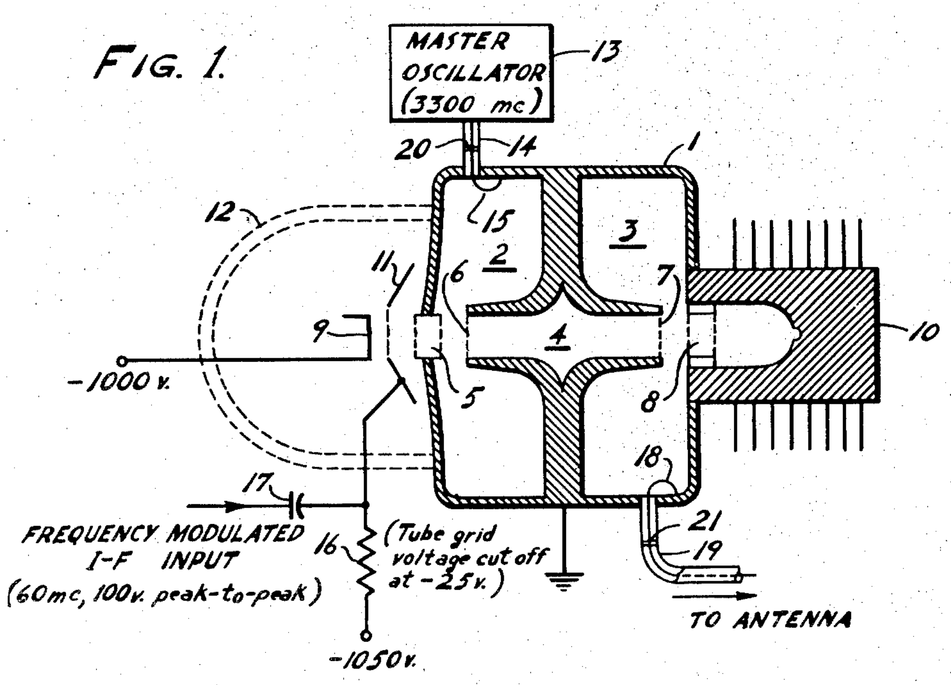

The invention herein described and claimed relates to signal mixing systems, and especially to such systems which are particularly adapted for use in mixing a plurality of electrical wave signals, at least one of which signals may be in the super-high frequency or microwave range. Mixers of the sort contemplated by the present invention are eminently adapted for use as "heterodyne modulators," whereby a relatively low frequency carrier-wave signal, modulated in amplitude, frequency, or phase, may be mixed with a much higher frequency unmodulated carrier-wave signal from any suitable continuous-wave signal generator to yield a similarly modulated, high-frequency, carrier-wave signal having a carrier frequency which is a heterodyne or other sideband modulation component of the low frequency carrier-wave signal and the high-frequency continuous-wave signal.

This method of modulation possesses numerous advantages over other methods available for use in producing modulated super-high frequency carrier-wave signals. For example, it is possible by this method to effect substantially more linear modulation of a super-high frequency carrier than by other known methods. Moreover, this method is particularly suited for use in microwave relay systems for the transmission of wide band (e. g. television) signals from point to point over relatively large distances in successive relays. This is owing to the fact that, where heterodyne modulation is employed, it is unnecessary, at each relay station in a chain, to demodulate the received, modulated, carrier-wave signal prior to retransmission. Instead, it is only necessary to convert the received signal to a suitable intermediate frequency, to amplify this intermediate frequency signal, and then to mix it, in accordance with the methods hereinafter to be set forth, with a suitable high frequency signal to yield a new modulated carrier-wave signal at a frequency which may be different from that of the received, modulated, high-frequency carrier and which may be situated in the super-high or microwave frequency range.

Accordingly the primary objects of my invention are:

(1) To provide improved methods of and means for mixing electrical wave signals to yield a resultant wave signal which is a sideband modulation component of the original wave signals (i. e. whose frequency is equal to the sum or difference of the frequency of one of said signals and an integral multiple of the frequency of the other of said signals), and which are particularly adapted to be used where the frequency of one of said signals is in the super-high frequency or microwave range;

(2) To provide improved methods of and means for producing frequency-modulated carrier-wave signals, particularly where the carrier frequency is to be situated in the super-high or microwave frequency range; and (3) To provide improved methods of and means for utilizing velocity-modulation type vacuum tubes as highly efficient mixers of electrical wave signals.

In my copending application, Serial No. 654,316, filed March 14, 1946, now Patent No. 2,493,801 dated January 10, 1950, and relating to an Electrical System, there was disclosed a method of and means for utilizing a velocity modulation type vacuum tube to mix a plurality of electrical wave signals, at least one of which might be in the super-high frequency range. In accordance with the teaching of that application, a continuous-wave signal, whose frequency was contemplated as being in the super-high frequency range, was applied to the input or bunching cavity of a conventional velocity-modulation type vacuum tube to effect modulation of the velocities of electrons in the tube at the frequency of the continuous-wave signal, whereby to produce density modulation of electrons in the vicinity of the output or catcher cavity of the tube. The electrons in the tube were further modulated in velocity in response to a lower frequency signal which, for example, might be a relatively low frequency, modulated, carrier-wave signal. Moreover, in accordance with the teaching of the aforementioned application, the electron current in the tube was rendered intermittent at the last-named frequency, and in such phase with reference to the low frequency modulation of the beam as to cause output power to be developed in the catcher cavity only during intervals corresponding to the existence of the desired heterodyne frequency. Thus, by appropriate phasing, it was made possible to develop power only at the desired heterodyne frequency and to cause the current in the tube to be cut off during those intervals in which power would otherwise be developed at the frequency of the continuous-wave signal or at the other heterodyne frequency. In this manner there was provided a method of utilizing a velocity-modulation type vacuum tube as a high-efficiency, heterodyne, frequency-modulator.

The present invention relates to a further method of utilizing a velocity-modulation type vacuum tube as a signal mixer, or more particularly as a heterodyne modulator, while obtaining advantages of efficiency and linearity comparable to those obtainable by application of the teachings of the aforementioned application. In certain respects the present invention may be regarded as based on an extension of the principles disclosed in the said copending application. However it also involves the application of certain new principles and methods which uniquely characterize it and distinguish it from the invention claimed in the aforementioned application. The novel features and advantages of the present method will become apparent upon reading the following specification.

In accordance with the method to which the present invention relates, the velocities of electrons in the velocity-modulation tube are modulated in response to a locally-generated, continuous-wave, high-frequency signal as in the method of the aforementioned application. Also, the beam of electrons in the tube is caused to flow intermittently at the lower frequency (i. e. of the modulated carrier-wave signal). However, in accordance with the present method, no particular phasing of this control with reference to the modulation of the beam, in response to the low frequency signal, is contemplated as in the method of the aforementioned application. On the contrary, according to the present method, power at the desired sideband frequency is abstracted from the electron beam solely through the expedient of tuning the output cavity of the velocity-modulation tube to the frequency of the desired heterodyne component, which may be either the sum or the difference of the high-frequency, continuous-wave signal and the low-frequency, carrier-wave signal, or to the frequency of any other sideband modulation component produced by mixing of these two signals in the manner described (i. e. the sum or difference of the high frequency and an integral multiple of the low frequency). Moreover, by operating the tube at a relatively low duty cycle at the lower frequency, it is possible to derive almost all of the available power, corresponding to the kinetic energy of the electron beam as it passes the output cavity, at the desired heterodyne or sideband frequency and to minimize substantially to the vanishing point the amount of power, corresponding to undesired heterodyne or sideband components, which is dissipated in the tube.

Figure 2:
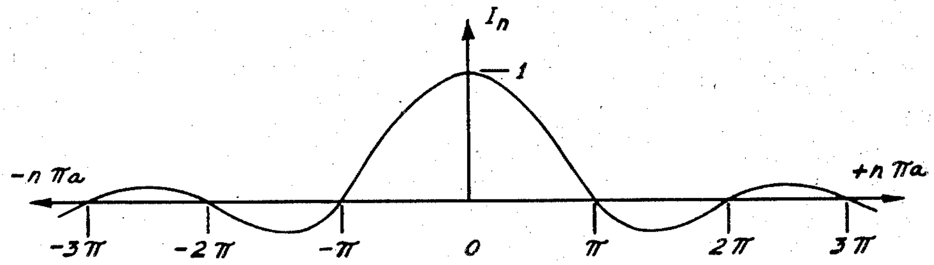

The details of this method and the mode of operation of apparatus by which it is accomplished, will be more fully understood from a consideration of the following specification with reference to the accompanying drawings in which:

Figure 1 is a schematic diagram of a conventional velocity-modulation type vacuum tube arranged in circuit for operation according to the invention, and Figure 2 is an explanatory diagram.

Referring now to Figure 1, the velocity-modulation type tube illustrated comprises a cavity resonator structure 1 of copper or other suitable material enclosing two coaxial, annular, reentrant cavities 2 and 3 connected by a cylindrical drift space 4, which is also coaxial with respect to the annular cavities 2 and 3. Opposite walls of each cavity are apertured in registry with the drift space 4 so as to provide for the passage of a beam of electrons through the centrally constricted portions of both cavities and through the drift space. These apertures are provided with conventional grids 5, 6, 7 and 8 adapted to influence or to be influenced by electrons passing them. Outside the cavity resonator structure and opposite grid 5 in the wall of cavity 2 is disposed a thermionic cathode 9, adapted to emit electrons which are drawn into the constricted portion of cavity 2, thence through drift space 4, and finally through the constricted portion of cavity 3. In the right-hand wall of cavity 3 is disposed a collector electrode 10 for receiving electrons passing through grid 8 from cavity 3 and to dissipate the kinetic energy remaining in the beam. Interjacent cathode 9 and grid 5 is disposed an electrostatic control grid 11 for controlling the intensity of the beam of electrons entering cavity 2 and drift space 4. Cathode 9 and grid 11 are enclosed within a glass envelope 12 sealed to the left-hand wall of the cavity resonator structure 1, and glass seals 20 and 21 are provided in transmission line sections 14 and 19 communicating respectively with cavities 2 and 3, whereby it is made possible to evacuate the discharge space for electrons emitted by cathode 9 enclosed by the walls of the cavity resonator structure 1.

For purposes of this specification, and in accordance with the nomenclature of the art relating to velocity-modulation type vacuum tubes, a drift space for electrically charged particles (e. g. drift space 4) may be defined as a region in which such particles are free to move without being subjected to substantial forces tending to accelerate them or to decelerate them.

According to the invention, a continuous-wave signal from master oscillator 13, the frequency of which may be in the super-high frequency range (e. g. 3300 megacycles), is supplied through a transmission line section 14 and coupling loop 15 to cavity 2. The dimensions of cavity 2 are made such that it will resonate at the frequency of the continuous-wave signal thus supplied, and in response to said signal, through the cooperation of grids 5 and 6, will produce modulation of the velocities of electrons passing from cathode 9 through the constricted portion of cavity 2 into drift space 4. In order to accelerate the electrons emitted by cathode 9 and to cause them to pass through cavity 2, drift space 4, cavity 3, and thence to the collector electrode 10, the cavity resonator structure 1 may be grounded in the manner shown, and the cathode 9 may be maintained at a suitable negative potential (e. g. −1000 volts) as indicated. This potential, and the length of the drift space 4 between grids 6 and 7, should be such that the super-high frequency signal supplied to cavity 2 will produce bunching or condensations in the density of the flow of electrons passing through the constricted portion of cavity 3 at the master oscillator frequency in a manner which is well understood by those familiar with the operation of velocity-modulation tubes.

Further in accordance with the invention, there is applied through coupling condenser 17 to grid 11 an intermediate-frequency input signal (e. g. 60 megacycles) which, in the event that the arrangement is to be employed as a "heterodyne modulator," may be frequency-modulated in response to the modulating intelligence. The magnitude of the intermediate-frequency signal thus supplied, and the bias applied to grid 11 through resistor 16 from a suitable source of potential, are so adjusted as to cause grid 11 to permit electrons to flow from cathode 9 into cavity resonator structure 1 during only a portion, corresponding to the peak, of each intermediate-frequency cycle. Thus, for example, if grid voltage cut-off for the tube occurs at −25 volts, and if the amplitude of the intermediate-frequency signal is 100 volts, peak-to-peak, the potential supplied to grid 11 through resistor 16 may be, for example, −1050 volts, so that current will flow in the tube during only approximately one-quarter of each intermediate-frequency cycle. In other words, as respects the I.-F. signal thus applied, the tube is operated class C at a relatively low duty cycle.

Under these circumstances the current in the space between grids 7 and 8 of output cavity 3 will comprise a fundamental component at the master oscillator frequency and sideband modulation components at frequencies equal to sums and differences of the master oscillator frequency and integral multiples of the intermediate frequency. If cavity 3 is tuned to the frequency of one of these components, the cavity and its associated grids 7 and 8 will cooperate to abstract, from the beam of electrons passing through the constricted portion of cavity 3, substantially all of the kinetic energy present in the beam in the form of modulated energy at the desired heterodyne or sideband modulation component frequency. This energy may be removed from cavity 3 by means of a suitable coupling loop 18 and transmission line section 19 for supply to a transmitting antenna or other signal utilization means. Thus, despite the fact that, in general, the beam current in the constricted portion of cavity 3 will comprise a fundamental component at the frequency of master oscillator 13, plus numerous sideband components corresponding to the sums and differences of the master oscillator frequency and integral multiples of the intermediate frequency, it has been found that, by operating the tube class C at a suitably low duty cycle, (that is by making the intervals of conduction short compared to an I.-F. cycle), substantially all of the energy available in the electron beam as it passes through the constricted portion of cavity 3 may be abstracted as energy at the desired sideband frequency merely by tuning cavity 3 to this frequency. This would not at first be anticipated, and the fact that this condition does obtain is susceptible of explanation as follows.

Assuming, for the moment, that grid 11 of the tube is so biased with reference to cathode 9 that current in the tube flows continuously and that no intermediate-frequency signal is applied to grid 11 to modulate the intensity of the electron beam, then, with signal impressed on cavity 2 from master oscillator 13, bunching of electrons in the constricted portion of cavity 3 at the master oscillator frequency would occur continuously. As would be expected, all of the kinetic energy contained in the beam as it passes between grids 7 and 8 of cavity 3 might be abstracted by tuning cavity 3 to the master oscillator frequency. Also it might be expected that if the electron beam is rendered intermittent at a frequency lower than that of the master oscillator, for example by the application to grid 11 of a signal of that frequency and by appropriately biasing grid 11 with respect to cathode 9, it would still be possible, by tuning cavity 3 to the master oscillator frequency, to abstract all of the kinetic energy in the beam passing between grids 7 and 8 in the form of energy at the master oscillator frequency. Moreover, assuming that cathode 9 is capable of supplying increased emission during the intervals of intermittent conduction, and assuming that the tube is suitably constructed so that voltage-breakdown will not occur, the accelerating potential and other potentials applied to the tube may be increased so as to permit the same amount of energy to be abstracted from the electron beam when the tube is thus intermittently operated as could be abstracted in continuous operation, without exceeding the dissipation capabilities of the tube.

As has already been mentioned, when the tube is operated intermittently, the electron current in the constricted region of cavity 3 comprises a fundamental component at the master oscillator frequency, and sideband components corresponding to the sums and differences of the master oscillator frequ ncy and integral multiples of the frequency at which the beam current is interrupted. This current is expressible mathematically as the sum of a Fourier series which, in exponential form, is given by the following expression:

$$i_{(t)}=Re\sum_{-\infty}^{\infty}I_n e^{j(\omega_0+n\omega_s)t} \qquad (1)$$

where Re denotes "the real part of," $I_n$ is the magnitude of the fundamental or sideband current component of order $n$, where $n$ is zero or a positive or negative integer, $\omega_0$ is the master oscillator frequency and $\omega_s$ is the frequency at which the beam current is interrupted.

The power abstracted at the master oscillator frequency is expressible in terms of the fundamental current component of this series. This component, being the only one to which cavity 3 presents substantial impedance when tuned to the master oscillator frequency, the impedance presented by the cavity to the various sideband components will be negligible, and hence the power output corresponding to those components will be inappreciable. On the other hand, if cavity 3, instead of being tuned to the master oscillator frequency, is tuned to one of the sideband frequencies corresponding to one of the sideband current components in the foregoing expression, then the cavity will present substantial impedance only to that particular sideband current component and to no other sideband components, nor to the fundamental component. Hence the substantial power output will be at the selected sideband frequency and will be expressible in terms of the particular sideband current component of the series. In this instance the power corresponding to the other current components will be substantially nil.

It is readily demonstrable that the magnitudes of the fundamental and sideband current components, in the Fourier expression given above for the current in the constricted portion of cavity 3, are dependent upon the magnitude of the duty cycle at which the tube is operated and, assuming, for example, that this current comprises pulses of substantially rectangular form at the intermediate frequency, these components are related according to the expression:

$$I_n=\frac{\text{Sin }(n\pi a)}{n\pi} \qquad (2)$$

where $I_n$ and $n$ represent the same quantities as in Equation 1 and $a$ is the duty cycle (i. e. the fraction of each I.-F. cycle during which current flows in the tube). In Figure 2, the magnitude of the current components $I_n$ are plotted as ordinates against the values of $n\pi a$ as abscissae. It will be noted that the magnitude of the fundamental component $I_0$ is unity and it will readily be seen that the magnitudes of the lower-order sideband current components will approximate very closely the fundamental current component for small values of $a$. Thus it is apparent that by operating the tube at a low duty cycle (that is with $a$ approaching zero), any one of the lower-order sideband current components may be made substantially equal to the fundamental current component. Then, if cavity 3 of the velocity modulation tube in the arrangement of Figure 1 is tuned to the frequency of this current component, there may be abstracted at this frequency substantially the same amount of power as could be abstracted at the fundamental frequency if the cavity were tuned to the fundamental. As has already been noted, this is the maximum amount of power which can be derived from the tube in any form, and hence it is obvious that the tube can be made to function as a signal mixer with efficiency comparable to that with which it could be made to function as a conventional velocity-modulation type amplifier.

There is another significant feature of the invention to which reference has not heretofore been made and which manifests itself particularly when the method is applied to accomplish heterodyne frequency modulation in the manner just discussed. It is characteristic of operation in this instance that the beam current in the velocity modulation tube is substantially free from any variation at the relatively low frequencies at which the input intermediate frequency applied to the grid of the tube is modulated. Owing to the existence of this condition, the ion distribution in the tube does not change appreciably with time as it would in response to relatively slow variations in the beam current such as would obtain were it attempted to effect modulation of the tube output in response to a modulating signal applied to the intensity-controlling grid.

Because of the maintenance, in this manner, of a substantially fixed distribution of ions in the vicinity of the electron beam, the normal focussing tendency of these ions on the electron beam is substantially invariant and there is no tendency toward distortion such as would be produced by alterations in the focussing of the beam at frequencies of the order of those which comprise the modulating signal. Moreover, because of the absence of relatively slow variations in the beam current, the temperatures of various elements of the tube (e. g. grid and cavity resonators) will be substantially invariant and there will be little tendency toward frequency instability owing to variations in the tube element temperatures. Hence, where the method of the invention is applied in the case of frequency modulation, there is no necessity for designing the tube so as to minimize the undesirable effects of ion redistribution and temperature variation of the elements. The method is usable to advantage even with tubes not specifically designed to minimize these effects.

Although the invention has been described with particular reference to its use for effecting highly linear and efficient modulation of a super-high frequency carrier-wave signal, it is to be emphasized, as has already been suggested, that its application is by no means so limited. It is usable to advantage wherever it may be desired to mix a plurality of electrical wave signals to yield a resultant heterodyne or sideband modulation component, and particularly where one or more of the signals to be mixed is of a frequency in the super-high or microwave frequency range. The means used to carry out the principles of the invention, of course, are not limited to those illustrated in connection with the representative embodiment hereinbefore described. In particular, the velocity-modulation type tube employed in practicing the invention may be of any conventional form, subject to such modifications as will occur to those skilled in the art in adapting it to particular applications in accordance with the general principles hereinbefore set forth. Thus, to indicate but a few of the possible variations in the form of the velocity modulation tube, the drift space need not necessarily be straight as illustrated, but if desired, and if such proves convenient, may be curved, the electrons or other charged particles being caused to follow a curved path, for example by the application of suitable magnetic fields. Likewise, the arrangement of the grids for producing modulation of the velocities of the charged particles in the tube may be varied considerably, as may also the means for applying the modulating potentials thereto. So also, the means utilized to effect modulation of the intensity of the electron current, and for causing it to flow intermittently at the frequency of one of the signals to be mixed, may take a variety of forms, and magnetic or, in some cases, even mechanical means may be substituted in whole or in part for the electrostatic control grids illustrated. Finally, the means used to extract power from the electron current at the desired side-band modulation component frequency may comprise any suitable means for coupling to the electron current and adapted to respond principally to the desired component frequency and to extract energy from the current by impeding the flow of the component current at that frequency.

Accordingly, the scope of the invention is not to be regarded as limited to the particular arrangement and apparatus disclosed for practicing the invention but is subject only to those limitations imposed by the appended claims.

I claim:

1. In a signal mixing system, an evacuated drift space for electrically charged particles, means for creating a flow of electrically charged particles in said drift space, means for cutting off said flow during time-spaced intervals recurrent at a relatively low frequency and of relatively long duration compared to the intervening intervals when said flow is not cut off, means for modulating at a relatively high frequency the velocities of particles in a first region of said drift space, whereby to produce in a second region of said drift space a current comprising a sideband modulation component of said low and high frequencies, and means principally responsive to said component for abstracting energy from said current.

2. In a signal mixing system for mixing a relatively low frequency signal and a relatively high frequency signal to yield a signal whose frequency is substantially the sum or difference of said high frequency and an integral multiple of said low frequency, a velocity modulation type vacuum tube comprising at least an emitter of electrically charged particles, a control grid, an input cavity resonator resonant at substantially said high frequency, a drift space for said particles, and an output cavity resonator resonant at substantially the frequency of the mixed signal to be produced, means for applying said low frequency signal to said control grid, means for biasing said grid to permit the flow of charged particles in said tube during appreciably less than one-half of each cycle of said low frequency signal, means for applying said high frequency signal to said input resonator in a manner to produce bunching of said current at said high frequency in the vicinity of said output cavity, and means for utilizing the energy developed in said catcher cavity.

3. In a heterodyne frequency modulator, a source of a modulated carrier wave signal of relatively low carrier frequency, an evacuated discharge space for electrically charged particles, means for creating a current of electrically charged particles through a region in said space, a control grid interposed in the path of said particles and supplied with said signal for modulating the intensity of said current, means for biasing said grid to permit the flow of charged particles in said discharge space during appreciably less than one-half of each cycle of said carrier signal, means for varying the intensity of said current at a substantially higher frequency whereby to produce in said region a current comprising a carrier which is a heterodyne modulation component of said low and high frequencies and which is modulated in substantially the same manner as said low frequency carrier, and means principally responsive to said component for abstracting energy from said current.

4. In a signal mixing system, an evacuated drift space for electrically charged particles, means for creating a flow of electrically charged particles in said drift space, means for modulating at a relatively high frequency the velocities of particles in a first region of said drift space, means for cutting off said flow during time-spaced intervals recurrent at a relatively low frequency whereby to produce in a second region of said drift space a current comprising a fundamental component at said high frequency and a sideband modulation component of said low and high frequencies, the durations of said last-named intervals being sufficiently long compared to the durations of intervening intervals when said current is permitted to flow to cause said sideband component to be substantially equal in magnitude to said fundamental component, and means principally responsive to said sideband component for abstracting energy from said current.

WILLIAM E. BRADLEY.

REFERENCES CITED

The following references are of record in the file of this patent:

UNITED STATES PATENTS

| Number | Name | Date |
|---|---|---|
| 2,190,515 | Hahn | Feb. 13, 1940 |
| 2,281,935 | Hansen et al. | May 5, 1942 |
| 2,409,608 | Anderson | Oct. 22, 1946 |
| 2,425,738 | Hansen | Aug. 17, 1947 |
| 2,500,945 | Hansen | Mar. 21, 1950 |